Nov. 15, 1955 D. F. PRESTON 2,724,093
COUPLING FOR GROUPS OF ELECTRICAL CONDUCTORS
Filed Oct. 22, 1952 2 Sheets-Sheet 1
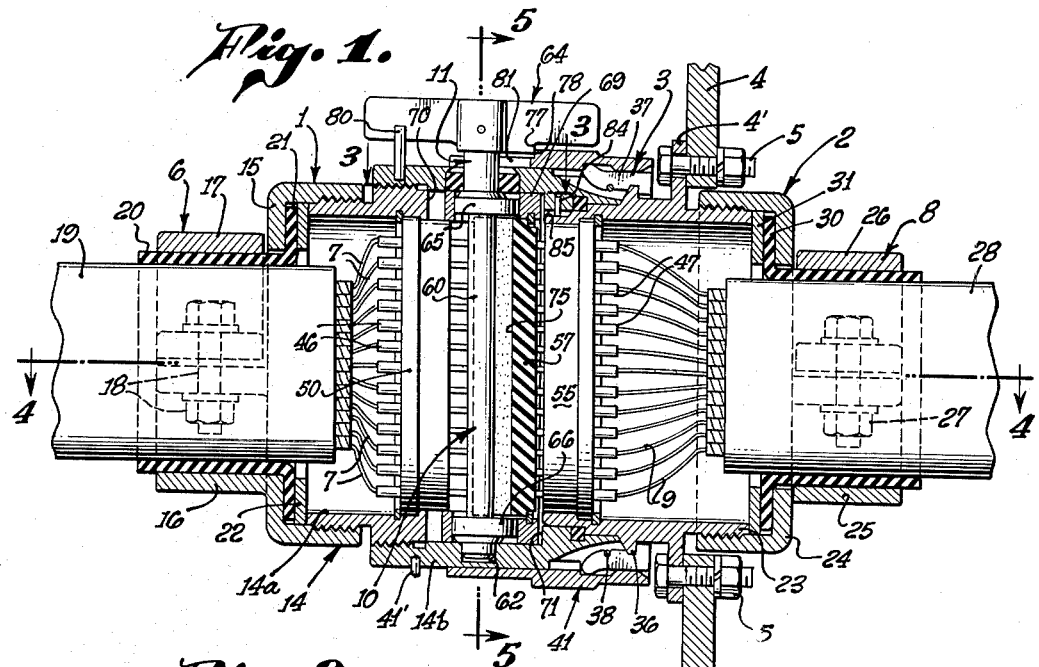
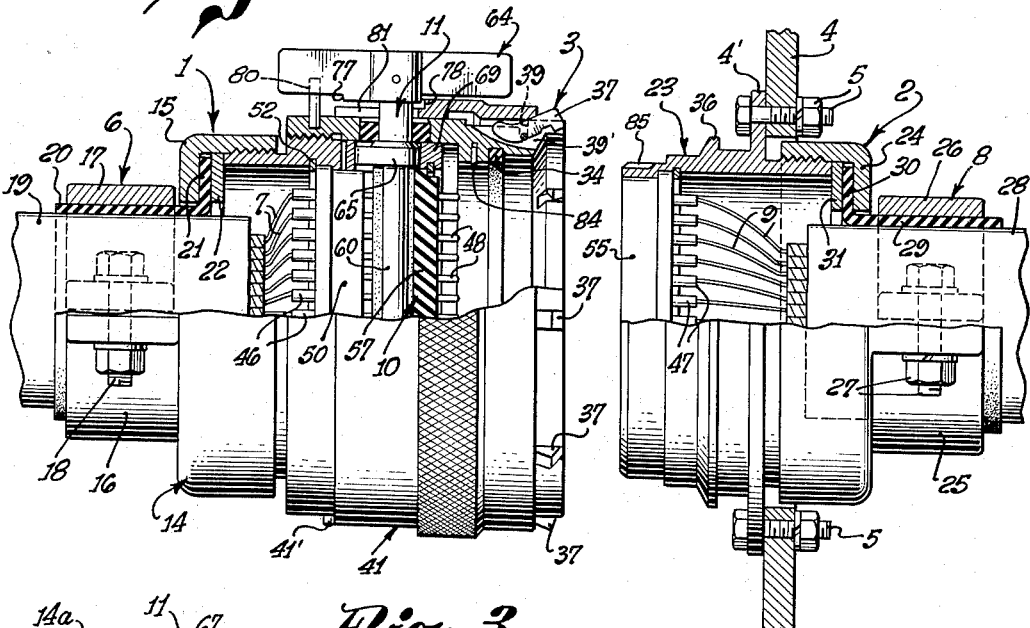
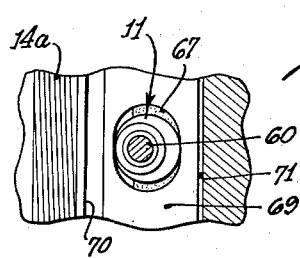
INVENTOR.
DON F. PRESTON,
BY
Paul A. Weilein
ATTORNEY.

Nov. 15, 1955  D. F. PRESTON  2,724,093
COUPLING FOR GROUPS OF ELECTRICAL CONDUCTORS
Filed Oct. 22, 1952  2 Sheets-Sheet 2
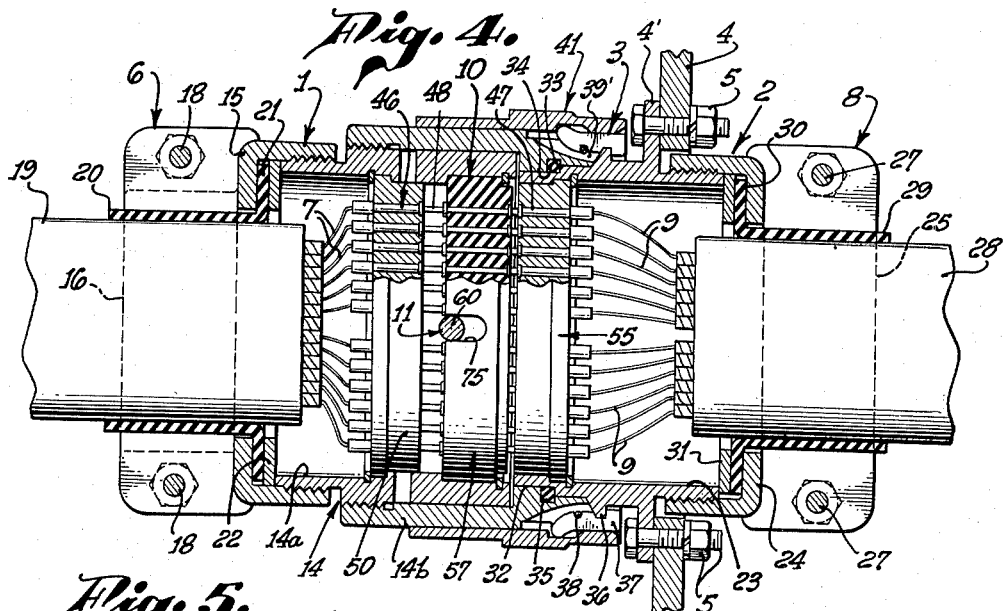
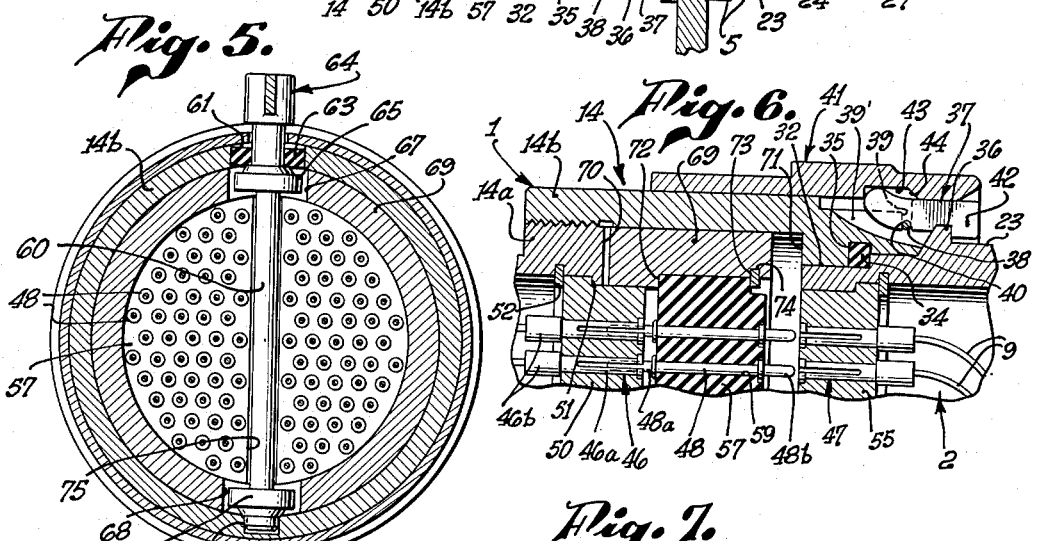
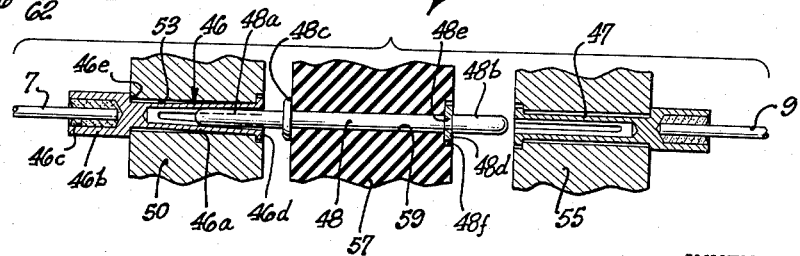
INVENTOR.
DON F. PRESTON,
BY
Paul A. Weilein
ATTORNEY.

United States Patent Office 2,724,093
Patented Nov. 15, 1955

2,724,093

COUPLING FOR GROUPS OF ELECTRICAL CONDUCTORS

Don F. Preston, Montebello, Calif., assignor to E. B. Wiggins Oil Tool Co. Inc., Los Angeles, Calif., a corporation of California Application October 22, 1952, Serial No. 316,157

15 Claims. (Cl. 339—75)

This invention relates to detachable couplings of the type employed for connecting and disconnecting groups of electrical conductors, particularly in aircraft, where it is the practice to detachably connect bundles or groups of such conductors at focal points, for example, at instrument panels, to complete a plurality of electrical circuits.

In couplings of this type, each pair of conductors adapted to be electrically connected, requires that a corresponding pair of contact elements in the separable coupling members be moved into and out of tight frictional engagement one with the other. Where a multiplicity of conductors are subject to connection in this manner, it is extremely difficult, and in many instances it has been impossible, to move the correspondingly large number of contact elements into and out of frictional contact with one another. Thus, the number of conductors that may be electrically connected with one coupling of the type heretofore used, is limited. In present day aircraft, a multiplicity of electrical conductors are grouped at different locations, and it is desired that as many of these conductors as possible per group be detachably electrically connected by means of a single coupling.

It is therefore an object of this invention to provide an improved coupling which may be easily operated to connect and disconnect a greater number of electrical conductors than heretofore, with assurance that a reliable electrical connection thereof will be maintained.

It is another object of this invention to provide in a coupling of the character described a novel means whereby a multiplicity of contact elements may be moved into and out of electrical contact with one another with consummate ease and without uncoupling the coupling members.

It is a further object of this invention to provide an electrical coupling such as described, wherein a pair of axially separable coupling members supporting the contact elements, may be locked in coupled relation and unlocked for uncoupling, while the electrical contact elements on the respective members are out of contact with one another; and wherein after locking the coupling members in coupled relation, the contact elements optionally may be moved into and out of electrical connection with one another.

It is another object of this invention to provide an electrical coupling such as described, wherein the electrical contact elements must be moved out of contact with one another in order to uncouple the coupling members.

It is a further object of this invention to provide an electrical coupling wherein one of the axially separable coupling members is provided with a manually operable means for effecting electrical connection of the contact elements on the respective coupling members, as well as for separating the contact elements.

It is a further object of this invention to provide an electrical coupling wherein the means for locking the coupling members in coupled relation is restrained from releasing the coupling members while the contact elements are electrically connected, but releases the coupling members when the contact elements are moved out of contact with one another.

This invention possesses many other advantages and has other objects which may be made more easily apparent from a consideration of one embodiment of the invention. For this purpose there is shown a form in the drawing accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawings:

Fig. 1 is a longitudinal, sectional view of a coupling embodying the present invention, as it would appear when connecting a plurality of electrical conductors;

Fig. 2 is a longitudinal half-sectional view, showing the coupling members uncoupled;

Fig. 3 is a fragmentary sectional view, taken on the line 3—3 of Fig. 1;

Fig. 4 is a longitudinal sectional view, taken on the line 4—4 of Fig. 1, showing portions of the electrical contact means broken away and in section to illustrate the manner in which the contact elements engaged one another;

Fig. 5 is a cross sectional view, taken on the line 5—5 of Fig. 1;

Fig. 6 is a fragmentary sectional view, on an enlarged scale, showing the manner of mounting the stationary and movable contact elements in the coupling and the construction of the contact elements, and Fig. 7 is a fragmentary, exploded, sectional view of the contact elements, on a further enlarged scale, as they would appear when disconnecting the conductors.

As shown in the accompanying drawing, a coupling embodying the present invention includes a tubular female coupling member 1, a tubular male coupling member 2 and means 3 for releasably locking the coupling members in coupled relation.

The male coupling member 2 is here shown as mounted on a support 4 by the aid of a flange 4' thereon and the fastenings 5, the coupling member 1 being free to be moved into and out of coupled relation with the coupling member 2.

Mounted on the coupling member 1 is a clamping means 6 for detachably securing thereto a multiplicity of electrical conductors 7. A similar clamping means 8 provides for securing a multiplicity of electrical conductors 9 to the coupling member 2.

Electrical connection and disconnection of the conductors joined to the respective coupling members 1 and 2, is provided for by contact means, generally designated 10, and operable in the bore of the coupling members responsive to an operating means 11. This operating means, in the present embodiment, is carried by the coupling member 1, and is subject to operation exteriorly thereof to electrically connect and disconnect the conductors after the coupling members are coupled and without requiring that the coupling members be uncoupled.

Means, which will be hereinafter described, is embodied in the operating means 11 and the locking means 3 respectively, whereby the locking means will prevent uncoupling of the coupling members while the conductors are electrically connected by the contact means 10, it being necessary to disconnect the conductors 7 from the conductors 9, then manually move the locking means out of locking position, before the members 1 and 2 may be uncoupled. This construction and arrangement assures a positive and reliable electrical connection of the conductors, as it precludes accidental uncoupling of the coupling members with consequent opening of the circuits formed by the conductors. Moreover, in having the contact means 8 operable responsive to the operating means 11, as here provided, independently of the operation of coupling the coupling members 1 and 2, it is possible to connect and disconnect a greater number of electrical conductors than with couplings of the type heretofore employed. In such previous couplings, it has been necessary to move the contact elements axially into and out of frictional contact with one another while coupling and uncoupling the coupling members thereof.

Referring more specifically to the coupling hereof, it will be seen that the female coupling member 1 includes a cylindrical shell-like body 14 formed of coaxial, threadedly connected sections 14a and 14b. This body is open at one end and has its other end closed by means of a flanged cap 15 screwed on the section 14a. The cap 15 carries one section 16 of the clamping means 6, the other clamp section 17 being connectable with the section 16 by means of fastenings 18 operable to tighten and release the clamp. This arrangement provides for clamping to the member 1 a conduit 19 containing the group of conductors 7. An insulation and sealing bushing 20, held by a flange 21 and a washer 22 in the cap 15, is interposed between the conduit 19 and the clamp sections 16 and 17, and excludes the entrance of moisture and foreign matter into the coupling.

The male coupling member 2 is provided with a cylindrical, shell-like body 23 similar to the body 14 of the member 1, in that it is open at one end and has its other end closed by a flanged cap 24 corresponding to the cap 15. The cap 24 carries a clamp section 25 for cooperation with a separable clamp section 26, connected thereto by fastenings 27 operable for releasably clamping to the member 2 a conduit 28 containing the conductors 9, there being an insulation and sealing bushing 29, flange 30 and washer 31 in the same arrangement as on the coupling member 1.

The open end of the body 23 of the male coupling 2 is reduced as at 32 and forms a shoulder 33, whereby this reduced end may be moved a limited extent into the bore of the female coupling member 1, to telescopically couple these members. The shoulder 33 is adapted to abut a sealing ring 34 mounted in a groove 35 in the bore of the body 14 of the member 1.

The locking means 3 for releasably holding the coupling members 1 and 2 in coupled relation, includes a plurality of locking dogs 37, pivotally mounted between their ends on a ring 38 seated in a groove 39 (Fig. 6) in the body 14 of the coupling member 1.

As shown in Fig. 6, each locking dog 37 is disposed in a recess 39' formed in the body 14, and is provided with a notch or recess 40 between its ends to receive the ring 38, being held in such relation to the ring by a sleeve 41 surrounding the body 14 and slidable axially thereon for rocking the dogs on the ring.

The locking dogs 37 are provided with hook ends 42, adapted to hook over the flange 36 on the body 23 of the coupling member 2, to lock the coupling members in coupled relation, as shown in Figs. 1, 4 and 6. Movement of the dogs 37 into locking position is effected by sliding the sleeve 41 forwardly from the position shown in Fig. 2, to the position shown in Fig. 1. In this movement, the sleeve will contact the outer ends of the dogs and move the hook ends over the flange 36, the inner ends of the dogs moving outwardly into an annular recess 43, interiorly of the sleeve, as clearly shown in Fig. 6. When extended into the recess 43, the dogs 37 limit forward movement of the sleeve to the extent shown in Figs. 1 and 6.

Upon moving the sleeve 41 rearwardly, an inclined shoulder 44 thereon will contact the inner ends of the dogs 37 and rock the dogs out of locking position into the releasing position shown in Fig. 2, the recesses 39' in the body 14 permitting the inner ends of the dogs to move inwardly, while the outer end of the sleeve, in moving rearwardly from the outer ends of the dogs, permits the outer ends of the dogs to swing outwardly. A stop pin 41' (Fig. 2) on the body 14, limits the rearward movement of the sleeve 41.

In general, the means for effecting electrical connection and disconnection of the conductors carried by the respective coupling members, includes stationary contact elements permanently, electrically connected with the several conductors carried by one of the coupling members, and movable contact elements permanently, electrically connected with the several conductors carried by the other coupling member. The movable elements are shiftable axially relative to the coupling members, into and out of frictional contact with the stationary contact elements. This axial movement of the movable elements is effected by operating means which provides sufficient leverage to move a multiplicity of the contact elements into and out of friction contact with one another with consummate ease and independently of the operation of coupling or uncoupling the coupling members.

One practicable arrangement of these contact elements, includes the provision of a set of stationary contact elements 46 fixed in the bore of the female coupling member 1, a set of stationary contact elements 47, identical with the elements 46, fixed in the bore of the male coupling member 2, and a set of movable contact elements 48 movable axially in the bore of one of said coupling members between positions connecting and disconnecting the stationary elements with one another. The conductors 7 and 9 are soldered to the stationary contact elements 46 and 47 respectively, to effect permanent electrical connection therewith. In the present embodiment of this invention, the movable contact elements 48 are mounted in the bore of the female coupling member 1 and remain in electrical contact with the stationary contact element 46 at all times, being movable into and out of contact with the stationary elements 47 in the coupling member 2 only.

A circular disk 50 of suitable (electrical) insulation material, supports the series of stationary contact elements 46, and is press fitted in the bore of the female coupling member 1. A peripheral portion of this disk is confined between a shoulder 51 and a snap ring 52 to hold the disk in place. A series of through openings 53 are formed in the disk 50 for mounting the contact element 46 therein. Each of the contact elements 46 (Fig. 7) consists of a split tubular body portion 46a of suitable resilient metal, having an enlarged and closed rear end 46b formed with a socket 46c in which one of the conductors 7 is secured as by being soldered therein. The outer end of the body 46a is open and provided with a flange 46d countersunk in the disk 50, whereby the contact element is held against axial displacement by this flange and a shoulder 46e formed by the enlarged end 46b. The split in the body portion 46a makes it possible to contract the contact element sufficiently to permit its insertion through one of the openings 53 in the disk 50 so that it will expand and cause the flange 46d to lock the contact element in place, as shown in Fig. 7.

A disk 55, corresponding to the disk 50, is press fitted in the bore of the male coupling member 2 and supports the plurality of contact elements 47 in the same manner as the contact elements 46 are supported in the disk 50. The contact elements 47 are of the same construction as the elements 46 and are soldered to the conductors 9 in the same manner as in the coupling member 1.

A disk 57 of electrical insulation material, is slidable axially of the bore of the female member 1, between the disk 50 and the open end of the bore, and supports the movable contact element 48. Each of these movable contact elements is pin-like and mounted in one of the series of through openings 59 in the disk 57, so that opposite end portions 48a and 48b project from opposite sides of the disk for insertion into the tubular contact element 46 and 47 opposite thereto. Each of these pin-like contact elements 48 has a stop ring 48c (Fig. 7) welded or otherwise fixed thereto so as to contact one face of the disk 57. This stop ring cooperates with a snap ring 48d applied to the contact element, as shown in Fig. 7, to hold the contact element in place. Each contact element 48 has a groove 48e to receive the snap ring 48d, which seats in a recess 48f in the face of the disk 57 opposed to the disk 55.

Fig. 7 shows the relative positions of the stationary and movable contact elements 46, 47 and 48 and the disks 50, 55 and 57, respectively, when the conductors 7 are disconnected from the conductors 9, it being noted that the end portions 48a of the movable contact elements 48 remain in contact with the tubular stationary elements 46 while the ends 48b are out of contact with the other stationary contact elements 47. However, as shown in Figs. 1 and 4, when the movable contact elements 48 are disposed to cause the end portions 48b thereof to contact the elements 47, the end portions 48a slide in the contact elements 46, but remain in electrical contact therewith. At this point, it should be noted that the movable contact elements 48 may be moved into and out of position connecting the conductors 7 with the conductors 9 while the coupling members remain in coupled relation.

The operating means for the coupling of this invention may be of any form which will provide sufficient mechanical advantage to move with comparative ease, the multiplicity of contact elements 48 into and out of engagement with the stationary contact elements 47. As here shown, this means includes a rotary shaft 60 extending through an opening 61 in the section 14b of the body 14 of the coupling member 1, with the inner end of the shaft seated in a bearing socket 62 in the bore of the body section 14b. Adjacent its outer end, the shaft 60 is supported in a bearing and sealing member 63 fitted in the opening 61, there being a handle 64 fixed on the outer end of the shaft to provide for the turning thereof.

Means is provided for operatively connecting the shaft 60 with the movable disk 57, whereby on turning of the shaft the disk 50 will move the contact elements 48 into and out of contact with the contact elements 47. As here shown, this means includes a pair of cams 65 and 66 fixed to the shaft 60 and operable in elongated cam openings 67 and 68 in a ring 69 surrounding and fixed to the disk 57. The ring 69 is slidably engaged with the inner surface of the body section 14b for limited axial movement between the inner end 70 of the body section 14b and a shoulder 71 formed on the body section 14b. The disk 57 is press fitted in the ring 69 and confined between a shoulder 72 on the ring and a snap ring 73 seated in a groove 74 in the ring, thereby securely connecting the ring and disk together as a unit to assure corresponding sliding movement thereof and to prevent relative angular movement between the ring and disk about the axis of the disk.

As the shaft 60 extends across the back of the disk 57, the latter is provided with a groove 75 to accommodate the shaft and permit of sliding movement of the disk upon rotation of the shaft.

The means hereinbefore referred to for preventing uncoupling of the coupling members 1 and 2 while the conductors connected with these coupling members are electrically connected, includes cooperable shoulders 77 and 78 on the handle 64 and the sleeve 41 respectively. When the contact members 48 are in position electrically connecting the contact elements 46 with the contact elements 47, the handle 64 is in the position shown in Fig. 1 and the shoulder 77 thereon abuts the shoulder 78 on the sleeve, thereby preventing rearward sliding of the sleeve as necessary to move the locking dogs 37 out of locking engagement with the flange 36 on the coupling member 2. When the shaft 60 is turned to cause the cams 65 and 66 to move the movable contact elements 48 out of contact with the contact elements 47, the handle 64 is disposed in the position shown in Fig. 2, and the sleeve 41 is free to be moved rearwardly to release the locking dogs 37, whereby the coupling members may be uncoupled. The handle 64 is limited to a turning movement of approximately 180° by a stop pin 80 on the body section 14b. This pin extends upwardly through a slot 81 in the sleeve so that it will be contacted by the handle, the slot 81 in the sleeve also accommodating the shaft 60, whereby the sleeve is slidable relative to the shaft between the positions shown in Figs. 1 and 2.

Indexing means is provided to assure that the coupling members will be coupled while in predetermined positions to properly connect the contact elements allocated to respective individual electrical circuits. Accordingly, a pin 84 is provided on the coupling member 2 so as to prevent coupling of the coupling members unless the pin is aligned with a groove 85 on the coupling member 2. As shown in Fig. 1, when the pin 84 is aligned with the groove 85, the coupling members may be coupled in the proper position to connect the respective individual circuits.

It will now be apparent that the present invention provides an electrical coupling which as a compact unit, makes it possible to electrically connect and disconnect a greater number of conductors for a greater number of electrical circuits than possible with previous couplings of the type to which this invention relates.

The manually operable means for connecting and disconnecting the multiplicity of contact elements while the coupling members are coupled, and the means requiring that the contact elements be disconnected before the coupling members may be uncoupled, assure that reliable electrical connections of the several circuits will be maintained and facilitate the frequent inspections of the electrical equipment as required by governmental regulations as to aircraft.

I claim:

1. A coupling for connecting and disconnecting a plurality of electrical conductors, comprising: a pair of axially separable, tubular coupling members; means on said members cooperable for releasably locking said members in coupled relation; a plurality of stationary contact elements mounted in the bore of one of said members; a plurality of movable contact elements; means supporting said movable elements in the bore of the other of said members for movement axially thereof; other contact elements in the bore of said other member at all times in contact with said movable elements; means on said other coupling member operable when said coupling members are coupled for moving said movable elements into and out of electrical contact with said stationary elements; and means on said other coupling member preventing uncoupling of said members while said movable elements are in electrical contact with said stationary elements but permitting uncoupling of said members when said movable elements are out of electrical contact with said stationary elements.

2. In a coupling for connecting and disconnecting a plurality of electrical conductors: a pair of tubular coupling members; means on said members cooperable for releasably holding said members in coupled relation; said means including a sleeve axially movable on one of said members to release said members; a plurality of stationary contact elements in each of said members; said contact elements having means providing for electrical connection thereof with the conductors to be connected by the coupling; a member movable axially in said one coupling member; a plurality of contact elements on said movable member in contact with the stationary elements in said one member; and means on said one coupling member connected with said movable member and operable while said coupling members are coupled, for moving said movable member to move the contact elements thereon into and out of a position for establishing electrical connection of said stationary elements on said one member with the corresponding stationary contact elements on the other of said members; said last named means including a rotary shaft and a handle on said shaft; and means on said handle and said sleeve respectively preventing releasing movement of said sleeve while said movable elements are in contact with the stationary elements on both of said members.

3. In a coupling for connecting and disconnecting a plurality of electrical conductors: a pair of tubular coupling members; cooperable means on said members for releasably holding said members in coupled relation; a plurality of stationary contact elements in the bore of one of said members; a plurality of movable contact elements in the bore of the other of said members; other contact elements in the bore of said other member at all times in contact with said movable elements; means on said other member operable when said members are coupled for moving said movable elements into and out of electrical contact with said stationary elements; and means on said other member preventing uncoupling of said coupling members while said movable contact elements are engaged with said stationary contact elements and permitting uncoupling of said coupling members when said movable elements are disengaged from said stationary elements.

4. In a coupling for connecting and disconnecting a plurality of electrical conductors; a pair of tubular coupling members; cooperable means on said members for releasably holding said members in coupled relation; a plurality of stationary contact elements in the bore of one of said members; a member movable axially in the bore of the other of said coupling members; other contact elements in the bore of said other member; a plurality of contact elements carried by said movable member and being at all times in contact with said other contacting elements; operating means on said other member connected with said movable member operable for moving said movable member to move the contact elements thereon into and out of engagement with said stationary elements; and cooperable means embodied in said operating means and said holding means respectively, preventing release of said holding means while said movable contact elements are in contact with said stationary contact elements.

5. In a coupling for connecting and disconnecting a plurality of electrical conductors: a pair of tubular coupling members; means cooperable on said members for releasably holding said members in coupled relation; a plurality of stationary tubular contact elements mounted in the bore of each of said members and adapted for electrical connection with said conductors; a member movable axially in the bore of one of said coupling members; a plurality of contact pins carried by and projecting from opposite sides of said movable member; means on said one member connected with said movable member operable when said coupling members are in coupled relation, for moving said movable member to move the contact pins into and out of a position for establishing electrical connection of said stationary elements with one another; said movable contact pins being at all times in electrical contact with the stationary contact elements in said one coupling member.

6. In a coupling for connecting and disconnecting a plurality of electrical conductors: a pair of tubular coupling members; means cooperable on said members for releasably holding said members in coupled relation; a plurality of tubular stationary contact elements in the bore of one of said members; a member movable axially in the bore of the other of said coupling members; a plurality of contact elements carried by said movable member; a set of tubular contact elements in said other member at all times engaged with the movable contact elements and operating means connected with said movable member for moving said movable member to move the contact elements thereon into and out of engagement with said stationary elements; said operating means including a shaft rotatably mounted in said other coupling member; cooperable cam elements on said shaft and said movable member; and a handle on said shaft.

7. In a coupling for connecting and disconnecting a plurality of electrical conductors: a pair of axially separable coupling members; means cooperable on said members for releasably holding said members coupled; a set of stationary contact elements on one of said members having means providing for connection thereof with certain of said conductors; a set of movable contact elements on the other of said members; means maintaining said movable elements in electrical connection with the other of said conductors; a disk movable on said other member and supporting said movable set for movement therewith; a ring fixed to and surrounding said disk; a shaft rotatably supported on said other member; a handle for turning said shaft; and means operatively connecting said shaft and said ring for moving said disk to connect and disconnect said elements upon rotation of said shaft.

8. In a coupling for connecting and disconnecting a plurality of electrical conductors: a pair of axially separable coupling members; cooperable means on said members for releasably holding said members in coupled relation; a set of stationary contact elements in one of said members; a set of movable contact elements in the other of said members; means for maintaining said movable elements in electrical connection with conductors; a disk movable on said other member and supporting said movable set for movement therewith; a ring fixed to and surrounding said disk; a shaft rotatably supported on said other member; a handle for turning said shaft; and cooperable cam elements on said shaft and said ring for moving said disk to connect and disconnect said contact elements on rotation of said shaft.

9. In a coupling for connecting and disconnecting a plurality of electrical conductors: a pair of tubular coupling members; means cooperable on said coupling members for releasably holding said coupling members in coupled relation; a disk of electrical insulation material fixed in the bore of each of said members; a plurality of stationary contact elements carried by each of said disks, said elements having portions adapted to be connected with a plurality of electrical conductors; a disk carried by one of said members for axial movement in the bore thereof; a plurality of contact elements carried by said movable disk and projecting from opposite sides thereof; said contact elements on said movable disk being at all times in electrical connection with the stationary contact elements on said one member; and means on said one member operable exteriorly thereof for moving said disk to dispose the elements on said movable disk in contact with the stationary elements on the other of said members.

10. In a coupling for connecting and disconnecting a plurality of electrical conductors: a pair of tubular coupling members, means cooperable on said members for releasably holding said coupling members in coupled relation, a disk of electrical insulation material fixed in the bore of each of said members, a plurality of stationary contact elements carried by each of said disks, adapted to be connected with a plurality of electrical conductors, a disk carried by one of said members for axial movement in the bore thereof, a plurality of contact elements carried by said movable disk arranged to establish an electrical connection between said stationary contact elements upon movement of said movable disk, said elements on said movable disk having portions at all times in electrical connection with the stationary elements on said one member, means on said one member operable exteriorly thereof for so moving said disk, and means on said one member preventing uncoupling of said members when said movable contact elements are in electrical contact with the stationary elements on both of said members, and releasing said coupling members for uncoupling thereof when said movable elements are out of contact with the stationary elements on the other of said members.

11. In a coupling for connecting and disconnecting groups of electrical conductors: a pair of tubular coupling members adapted to be telescopically coupled one to the other, means cooperable on said members for releasably locking said members in coupled relation, a disk of electrical insulation material fixed within the bore of each of said members, a plurality of stationary contact elements supported by each disk, each of said stationary contact elements having a portion thereof adapted for electrical connection with an electrical conductor, a disk of electrical insulation material movable axially in the bore of one of said members, contact elements mounted on said movable disk for movement therewith into and out of position to contact and electrically connect the stationary elements on the other of said members with the stationary elements on said one member, and means operable on said one member for so moving said movable disk, said movable contact elements being at all times in contact with the stationary contact elements on said one member.

12. In a coupling for connecting and disconnecting groups of electrical conductors: a pair of tubular coupling members adapted to be telescopically coupled one to the other, cooperable means on said members for releasably locking said members in coupled relation, a disk of electrical insulation material fixed within the bore of each of said members, a plurality of stationary contact elements supported by each disk, each of said stationary contact elements having a portion thereof adapted for electrical connection with an electrical conductor, a disk of insulation material movable axially in the bore of one of said members, contact elements mounted on said movable disk for movement therewith into and out of position to contact and electrically connect the stationary elements on said one member with the stationary elements on the other of said members, means operable on said one member for so moving said movable disk, said movable contact elements being at all times in contact with the stationary contact elements on said one member, and means on said one member preventing release of said locking means when said movable contact elements are in contact with the stationary elements on the other of said members and releasing said locking means when said movable elements are out of contact with the stationary elements on the other of said members.

13. In a coupling for connecting and disconnecting a plurality of electrical conductors: a pair of axially separable tubular coupling members, cooperable elements on said members for releasably holding said members in coupled relation, a plurality of stationary contact elements mounted in the bore of each of said members, a plurality of movable contact elements, a member movable in the bore of one of said members supporting said movable contact elements, said stationary and movable contact elements being coaxially related to one another, said movable contact elements extending in opposite directions from said movable member and having portions at all times in contact with the stationary contact elements on said one coupling member, a shaft mounted on said one coupling member, means for turning said shaft, and means connecting said shaft with said movable member operable upon the turning of said shaft to move said movable member to dispose said movable contact elements into and out of a position electrically connecting the stationary contact elements in one coupling member with the stationary contact elements in the other coupling member.

14. In a coupling for connecting and disconnecting a plurality of electrical conductors: a pair of axially separable tubular coupling members, cooperable elements on said members for releasably holding said members in coupled relation, a plurality of stationary contact elements mounted in the bore of each of said members, a plurality of movable contact elements, a member movable in the bore of one of said members supporting said movable contact elements, said stationary and movable contact elements being coaxially related to one another, said movable contact elements extending in opposite directions from said movable member, a shaft mounted on said one coupling member, a ring mounted on the periphery of said movable member for movement therewith, said ring slidably engaging the wall of the bore of said one coupling member and having cam receiving openings therein, and cams on said shaft operable in said openings on turning the shaft, for moving said ring and said member to dispose said movable contact elements into and out of electrical connection with said stationary contact elements.

15. In a coupling for connecting and disconnecting a plurality of electrical conductors: a pair of axially separable tubular coupling members, cooperable elements on said members for releasably holding said members in coupled relation, a plurality of stationary contact elements mounted in the bore of each of said members, a plurality of movable contact elements, a member movable in the bore of one of said members supporting said movable contact elements, said stationary and movable contact elements being coaxially related to one another, said movable contact elements extending in opposite directions from said movable member, a shaft mounted on said one coupling member, a ring mounted on the periphery of said movable member for movement therewith, said ring slidably engaging the wall of the bore of said one coupling member and having cam receiving openings therein, and cams on said shaft operable on turning the shaft for moving said ring and said member to dispose said movable contact elements into and out of electrical connection with said stationary contact elements, said movable member having a slot therein receiving said shaft.

References Cited in the file of this patent
FOREIGN PATENTS 715,899     France _____ Oct. 5, 1931